United States Patent [19]

Sigling et al.

[11] Patent Number: 5,404,708
[45] Date of Patent: Apr. 11, 1995

[54] METHOD FOR OPERATING A GAS AND STEAM TURBINE PLANT AND GAS AND STEAM TURBINE PLANT OPERATING ACCORDING TO THE METHOD

[75] Inventors: Ralf Sigling, Baiersdorf; Ralf Spinner, Oberreichenbach, both of Germany

[73] Assignee: Siemens Aktiengesellschaft, Munich, Germany

[21] Appl. No.: 92,011

[22] Filed: Jul. 15, 1993

[30] Foreign Application Priority Data

Jul. 15, 1992 [DE] Germany ............. 42 23 281.3

[51] Int. Cl.$^6$ .............................................. F02G 3/00
[52] U.S. Cl. ................................. 60/39.05; 60/39.182
[58] Field of Search ............. 60/39.182, 39.5, 39.53, 60/39.05, 39.3, 39.183

[56] References Cited

U.S. PATENT DOCUMENTS

| | | | |
|---|---|---|---|
| 3,369,361 | 2/1968 | Craig | 60/39.5 |
| 4,437,313 | 3/1984 | Taber et al. | 60/39.182 |
| 4,572,110 | 2/1986 | Haeflich | 60/39.182 |
| 4,875,436 | 10/1989 | Smith et al. | 60/39.182 |
| 4,893,468 | 1/1990 | Hines | 60/39.05 |
| 5,282,355 | 2/1994 | Yamaguchi | 60/39.5 |

FOREIGN PATENT DOCUMENTS

| | | | |
|---|---|---|---|
| 0148973 | 10/1987 | European Pat. Off. | |
| 58-192908 | 11/1983 | Japan . | |
| 0171834 | 8/1986 | Japan | 60/39.182 |
| 3036409 | 2/1991 | Japan | 60/39.182 |
| 4-161702 | 9/1992 | Japan . | |

Primary Examiner—Timothy S. Thorpe
Attorney, Agent, or Firm—Herbert L. Lerner; Laurence A. Greenberg

[57] ABSTRACT

A method for operating a gas and steam turbine plant includes producing steam for a steam turbine by utilizing heat contained in pressure-relieved flue gas of a gas turbine, and decreasing the temperature of the pressure-relieved flue gas upon the onset of a critical operating state, by introducing water into the pressure-relieved flue gas. A gas and steam turbine plant includes a gas turbine having a flue gas conduit, a steam turbine having a water-steam loop, a steam generator being connected to the flue gas conduit downstream of the gas turbine for producing steam in the water-steam loop, and a device for introducing water into the flue gas conduit.

7 Claims, 1 Drawing Sheet

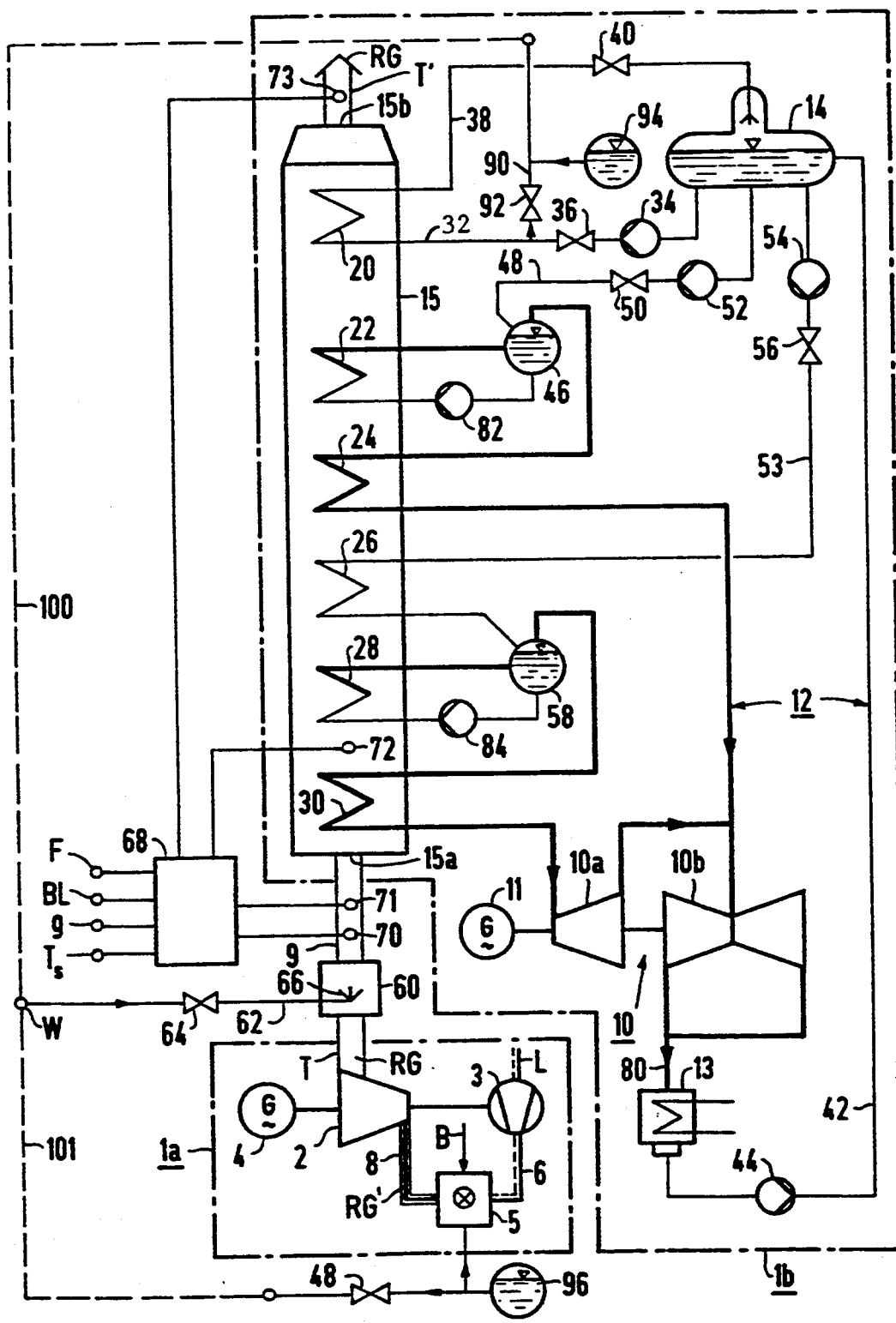

though the temperature or a temperature change of the pressure-relieved flue gas may be detected, in order to form a correcting variable for the quantity of water to be delivered per unit of time.

METHOD FOR OPERATING A GAS AND STEAM TURBINE PLANT AND GAS AND STEAM TURBINE PLANT OPERATING ACCORDING TO THE METHOD

BACKGROUND OF THE INVENTION

FIELD OF THE INVENTION

The invention relates to a method for operating a gas and steam turbine plant, in which heat contained in pressure-relieved flue gas of the gas turbine is utilized to produce steam for the steam turbine. It also relates to a gas and steam turbine plant that operates according to the method.

In a gas and steam turbine plant, the heat contained in the pressure-relieved flue gas of the gas turbine is utilized to produce steam for the steam turbine. The heat transfer takes place in a steam generator, which is located downstream of the gas turbine and in which heating surfaces, in the form of tubes or banks of tubes connected into the water-steam loop of the steam turbine, are disposed. The water-steam loop typically includes two pressure stages, and the heating surfaces of each pressure stage are subdivided into a preheater and an evaporator as well as a superheater. One such gas and steam turbine plant is known, for instance, from European Patent No. 0 148 973 B1.

When the pressure-relieved flue gas entering the steam generator is at a high temperature, and when there is a large total quantity of water available in the water-steam loop, especially low temperatures of the flue gas leaving the steam generator are achieved. That means that in full-load operation, the efficiency of the system is especially high. Typically, the parts of the system acted upon by the pressure-relieved flue gas, that is the steam generator or waste heat boiler and its built-in fixtures, are therefore constructed for full-load or rated-load operation.

However, during operation of such a system, the quantity of heat introduced into the steam generator can vary under various operating conditions. Critical operating states often arise as a result of the variable dynamic performance of the plant components, or in other words because of the comparatively long delay or reaction times of the steam turbine system as compared with the gas turbine system. For instance, in startup operation or upon load changes, and particularly in so-called fast starts or quick load changes, major temperature gradients and/or changes in the temperature over time, as well as sudden changes in the mass flow of pressure-relieved flue gas arise. Those changes, if they exceed certain maximum values over the course of time, can cause damage or can shorten the life of the system parts. Therefore, that kind of operation can endanger the steam generator.

The gas turbine system is therefore typically throttled in the startup and load change modes. That is generally done by controlling the quantity of fuel delivered to the gas turbine combustion chamber per unit of time as a function of the particular allowable changes in the pressure-relieved flue gas. In an extreme case, the pressure-relieved flue gas is diverted upstream of the steam generator through a bypass chimney. In the case of a gas and steam turbine plant, that represents a limitation in system availability.

In a gas and steam turbine plant without a bypass chimney, a critical operating state arises particularly when the system is operating in the so-called simple cycle mode. In that operating state, only the gas turbine is used to generate electricity. The steam produced in the steam generator must then be carried directly into the water-steam loop without conversion of energy in the steam turbine. Further steam production in the steam generator is necessary to avoid drying out of the heat exchanger tubes from impermissibly high temperatures at the heating surfaces.

Although damage can be kept slight by using special, high-quality and therefore expensive materials for the applicable system parts, heretofore the options in a fast start or quick load change of the gas turbine were extremely limited, because of the high thermal strain on the system parts those situations involved. With that mode of operation, it is not possible to use catalysts to scrub the flue gas.

SUMMARY OF THE INVENTION

It is accordingly an object of the invention to provide a method for operating a gas and steam turbine plant and a gas and steam turbine plant operating according to the method, which overcome the hereinafore-mentioned disadvantages of the heretofore-known methods and devices of this general type and in which in all operating states, including the startup mode or load change mode, the gentlest possible mode of operation will be attained with simultaneously high overall efficiency, if a critical operating state occurs.

With the foregoing and other objects in view there is provided, in accordance with the invention, a method for operating a gas and steam turbine plant, which comprises producing steam for a steam turbine by utilizing heat contained in pressure-relieved flue gas of a gas turbine, in a gas and steam turbine plant; and decreasing the temperature of the pressure-relieved flue gas upon the onset of a critical operating state, by introducing water into the pressure-relieved flue gas.

The temperature or a temperature change of the pressure-relieved flue gas may be detected, in order to form a correcting variable for the quantity of water to be delivered per unit of time.

In accordance with another mode of the invention, there is provided a method which comprises delivering the water as a function of a travel and/or time-dependent change in the flue gas temperature.

In accordance with a further mode of the invention, there is provided a method which comprises averting a drop below the dew point of the pressure-relieved flue gas by supplying the water in such a way that the temperature of the flue gas as it leaves the steam generator downstream of the gas turbine does not drop below a predetermined minimum value. In the case of corresponding closed-loop or open-loop control, this minimum value can be specified as the input variable. In addition, the sulfur content of the fuel and the proportion of fuel to air during combustion in the gas turbine combustion chamber, as well as the moisture in the flue gas, can all be detected.

In accordance with an added mode of the invention, there is provided a method which comprises taking the water introduced into the flue gas from the water-steam loop of the steam turbine or alternatively diverting the water from a water connection or water supply for the combustion chamber of the gas turbine. Water furnished in this water supply is typically used to reduce the development of nitrogen oxides during combustion of the fuel in the gas turbine combustion chamber.

With the objects of the invention in view, there is also provided a gas and steam turbine plant, comprising a gas turbine having a flue gas conduit for carrying pressure-relieved flue gas; a steam turbine having a water-steam loop; a steam generator being connected to the flue gas conduit downstream of the gas turbine and being connected to the water-steam loop, for generating or producing steam in the water-steam loop from heat contained in the pressure-relieved flue gas; and means for introducing water into the flue gas conduit for decreasing the temperature of the pressure-relieved flue gas upon the onset of a critical operating state.

In accordance with another feature of the invention, the means for introducing the water include an injector device being disposed inside the flue gas conduit and communicating with a water reservoir.

In accordance with a further feature of the invention, there is provided at least one actuator being adjustable as a function of the flue gas temperature and being connected to the injector device.

In accordance with an added feature of the invention, there are provided at least two temperature sensors along the flue gas path for detecting a travel and/or time-dependent temperature change. Both temperature sensors may advantageously be disposed inside the flue gas conduit, in other words in the region between the gas turbine and the steam generator. In accordance with an additional feature of the invention, there is provided a further temperature sensor inside the steam generator.

In accordance with yet another feature of the invention, there is provided a temperature sensor at the output of the steam generator, being connected to a device for monitoring a minimum value. This sensor is intended to assure that the temperature of the flue gas upon leaving the steam generator will not drop below the acid dew point.

In accordance with a concomitant feature of the invention, the injector device includes a number of nozzles. A network of nozzles may be disposed centrally in the flue gas conduit. Alternatively, with suitable dimensioning, the nozzles may be disposed peripherally in the flue gas conduit, for instance on one wall or several walls of the flue gas conduit. The advantage of this alternative is that the nozzles themselves are protected and cause no substantial additional pressure losses in the flue gas conduit.

Other features which are considered as characteristic for the invention are set forth in the appended claims.

Although the invention is illustrated and described herein as embodied in a method for operating a gas and steam turbine plant and a gas and steam turbine plant operating according to the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing is a schematic and block circuit diagram of a gas and steam turbine plant with an injector device for water in a flue gas conduit.

DESCRIPTION OF THE PREFERRED EMBODIMENTS

Referring now to the single figure of the drawing in detail, there is seen a gas and steam turbine plant which includes a gas turbine system 1a and a steam turbine system 1b. The gas turbine system 1a includes a gas turbine 2 with an air compressor 3 and a generator 4 coupled thereto, as well as a combustion chamber 5 being connected upstream of the gas turbine 2 and being connected to a fresh-air line 6 of the air compressor 3. A flue gas line is indicated at reference numeral 8 and a flue gas conduit of the gas turbine 2 is indicated at reference numeral 9.

The steam turbine system 1b includes a steam turbine 10 with a generator 11 coupled thereto and a water-steam loop 12 having a condenser 13 downstream of the steam turbine 10, a feedwater container 14 downstream of the condenser 13, as well as a steam generator 15.

In order to deliver pressure-relieved or expanded flue gas or exhaust gas RG from the gas turbine 2 to the steam generator 15, the flue gas conduit 9 is connected to one inlet 15a of the steam generator 15. The pressure-relieved flue gas RG leaves the steam generator 15 through an outlet 15b in the direction of a non-illustrated chimney.

As its heating surfaces, the steam generator 15 includes a condensate preheater 20, an evaporator 22 and a superheater 24 of a low-pressure stage, as well as an economizer 26, an evaporator 28 and a superheater 30 of a high-pressure stage. The superheaters 24 and 30 respectively communicate with a a low-pressure part 10b and a high-pressure part 10a of the steam turbine 10. The preheater 20 is connected to the feedwater container 14 both on the inlet side through a line 32 in which a recirculating pump 34 and a valve 36 are located, and on the outlet side through a line 38 that includes a valve 40. The condenser 13 is likewise connected to the feedwater container 14 through a line 42 in which a condensate pump 44 is located.

A water-steam separating container 46 of the low-pressure stage, to which the evaporator 22 and the superheater 24 are connected, is likewise connected through a line 48 to the output side of the feedwater container 14. A valve 50 and a low-pressure pump 52 are located in the line 48.

The economizer 26 of the high-pressure stage is connected on the inlet side to the feedwater container 14, through a line 53 in which a high-pressure pump 54 and a valve 56 are located. The economizer 26 communicates on the outlet side with a water-steam separating container 58. The evaporator 28 and the superheater 30 of the high-pressure stage are connected to the water-steam separating container 58.

An injector device 60 is disposed in the flue gas conduit 9 and is connected with an actuator 64 through a line 62. The injector device 60, which is shown herein in highly simplified fashion, includes a number of nozzles 66 that are disposed centrally or peripherally in the flue gas conduit 9.

By way of example, the nozzles 66 may be distributed in networklike fashion across the cross section of the flue gas conduit 9. However, in order to avoid pressure losses inside the flue gas conduit 9, the nozzles 66 may also be disposed directly on the walls of the flue gas conduit 9. The actuator 64, such as a valve, is connected to a regulating device or a device for measured value preparation 68. The device 68 is connected on the input side to temperature sensors 70–73, which are distributed along the flue gas path. The sensors 70 and 71 are disposed inside the flue gas conduit 9, and the sensor 72 is disposed inside the steam generator 15. The sensor 73 is located in the vicinity of the outlet 15b of the steam generator 15.

During operation of the gas and steam turbine plant 1a, 1b, the combustion chamber 5 is supplied with fuel B. The fuel B is combusted in the combustion chamber 5 with compressed air L from the air compressor 3. Hot flue gas RG' produced during the combustion is carried through the flue gas line 8 into the gas turbine 2. The hot flue gas RG' expands in the gas turbine 2 and in so doing drives the gas turbine 2. This turbine in turn drives the air compressor 3 and the generator 4. The expanded, still-hot flue gas RG emerging from the gas turbine 2 is carried through the flue gas conduit 9, into the steam generator 5, where it is used to produce steam for the steam turbine 10.

The steam emerging from the low-pressure part 10b of the steam turbine 10 is delivered through a steam line 80 to the condenser 13 and condensed there. The condensate is pumped into the feedwater container 14 through the pump 44. In order to preheat the feedwater, a partial quantity of the feedwater, which is adjustable by means of the valves 36 and 40, is carried in a loop through the recirculating pump 34 and through the preheater 20.

The preheated feedwater is pumped by the low-pressure pump 52 into the water-steam separating container 46 of the low-pressure stage and through the high-pressure pump 54 and the economizer 26 into the water-steam separating container 58 of the high-pressure stage. The various quantities of feedwater per unit of time are adjusted by means of the respective valves 50 and 56.

In the low-pressure stage, the feedwater is pumped through the evaporator 22 by a recirculating pump 82 and then back again into the water-steam separating container 46. The steam produced in this process is separated from the water and is superheated in the superheater 24. In the low-pressure part 10b of the steam turbine 10, the superheated steam is expanded and flows through the line 80 into the condenser 13.

In the high-pressure stage, the feedwater which is at high pressure is first heated in the economizer 26 and is evaporated in the evaporator 28, which communicates through a recirculating pump 84 with the water-steam separating container 58. The steam is superheated in the superheater 30 and delivered to the high-pressure part 10a of the steam turbine 10. The steam, which is pressure-relieved or expanded there, is carried together with the steam produced in the low-pressure stage to the low-pressure part 10b of the steam turbine 10.

The parts of the system being acted upon by the hot, pressure-relieved flue gas RG, or in other words the walls of the steam generator 15 and its built-in fixtures, in particular the heating surfaces 20–30, are typically constructed in such a way as to achieve high efficiency of the system for full-load operation. In partial-load operation, the capacity of the gas turbine 2 is often reduced, with the consequence that the temperature T of the pressure-relieved flue gas RG drops. This in turn causes a decrease in the quantity of steam produced and a disproportionate reduction in the available total water quantity or feedwater flow. Upon a new load change, and also upon startup of the gas turbine, critical operating states can be attained because of the rapid rise of the flue gas temperature T or because of major temperature and/or mass flow changes in the pressure-relieved flue gas RG, while at the same time only a slight quantity of feedwater is available. If such a critical operating state arises, the temperature T of the pressure-relieved flue gas RG is reduced by introducing water W into the pressure-relieved flue gas RG.

The water W is delivered through the line 62 to the injector device 60 and is injected by means of the nozzles 66 into the flue gas RG, or in other words into the flue gas flow. As is suggested by the dashed lines 100 and 101, the water supply to the injector device 60 may be drawn from various water reservoirs. Advantageously, the water W is taken from the water-steam loop 12. To that end, a branch 90 with a valve 92 that communicates with a container 94 is connected to the line 32. The container 94 also serves as a water reservoir for the water-steam loop 12 of the steam turbine 10. Alternatively, however, the water W can also be taken from a water connection 96 for the combustion chamber 5 of the gas turbine 2, through a valve 48.

In order to adjust the quantity of water to be introduced into the flue gas conduit 9 per unit of time, a controlled variable s formed in the device 68 is supplied to the actuator 64. To that end, through the use of the temperature sensors 70, 71, 72, the course of the temperature T over time, and optionally the three-dimensional temperature distribution $\Delta T$ of the pressure-relieved flue gas RG, are detected. The temperature T' of the pressure-relieved flue gas RG upon leaving the steam generator 15 is also measured, by means of the temperature sensor 73. In the device 68, this temperature T' is compared with a predetermined minimal or reference value $T_s$. This is intended to prevent the flue gas temperature T' from dropping below the acid dew point. Other input variables fed to the device 68 for this purpose are the sulfur content g of the fuel B, the ratio BL of the fuel B to the air L during combustion in the combustion chamber 5, and the flue gas moisture F.

By introducing water W into the pressure-relieved flue gas RG when a critical operating state is entered, the variable dynamic performance of the gas turbine system as compared with the steam turbine system is compensated for to a certain extent, so that on one hand a gentle mode of operation is attained, and that on the other hand high system availability is achieved.

We claim:

1. A method for operating a gas and steam turbine plant, which comprises:
   producing steam for a steam turbine by utilizing heat contained in pressure-relieved flue gas of a gas turbine, in a gas and steam turbine plant; and
   decreasing the temperature of the pressure-relieved flue gas upon the onset of a critical operating state, by introducing water into the pressure-relieved flue gas as a function of a variation in the flue gas temperature.

2. The method according to claim 1, which comprises introducing the water as a function of a travel-dependent variation in the flue gas temperature.

3. The method according to claim 1, which comprises introducing the water as a function of a time-dependent variation in the flue gas temperature.

4. The method according to claim 1, which comprises introducing the water as a function of travel and time-dependent variations in the flue gas temperature.

5. The method according to claim 1, which comprises adjusting the introduction of water to prevent the temperature of the flue gas upon exiting a steam generator connected downstream of the gas turbine from dropping below a predetermined minimum value.

6. The method according to claim 1, which comprises taking the water introduced into the flue gas from a water-steam loop of the steam turbine.

7. The method according to claim 1, which comprises taking the water introduced into the flue gas from a water connection for a combustion chamber of the gas turbine.

* * * * *